Jan. 7, 1930. W. B. BOICE ET AL 1,742,644
ADJUSTABLE TABLE FOR WOODWORKING MACHINES AND THE LIKE
Filed Nov. 12, 1927
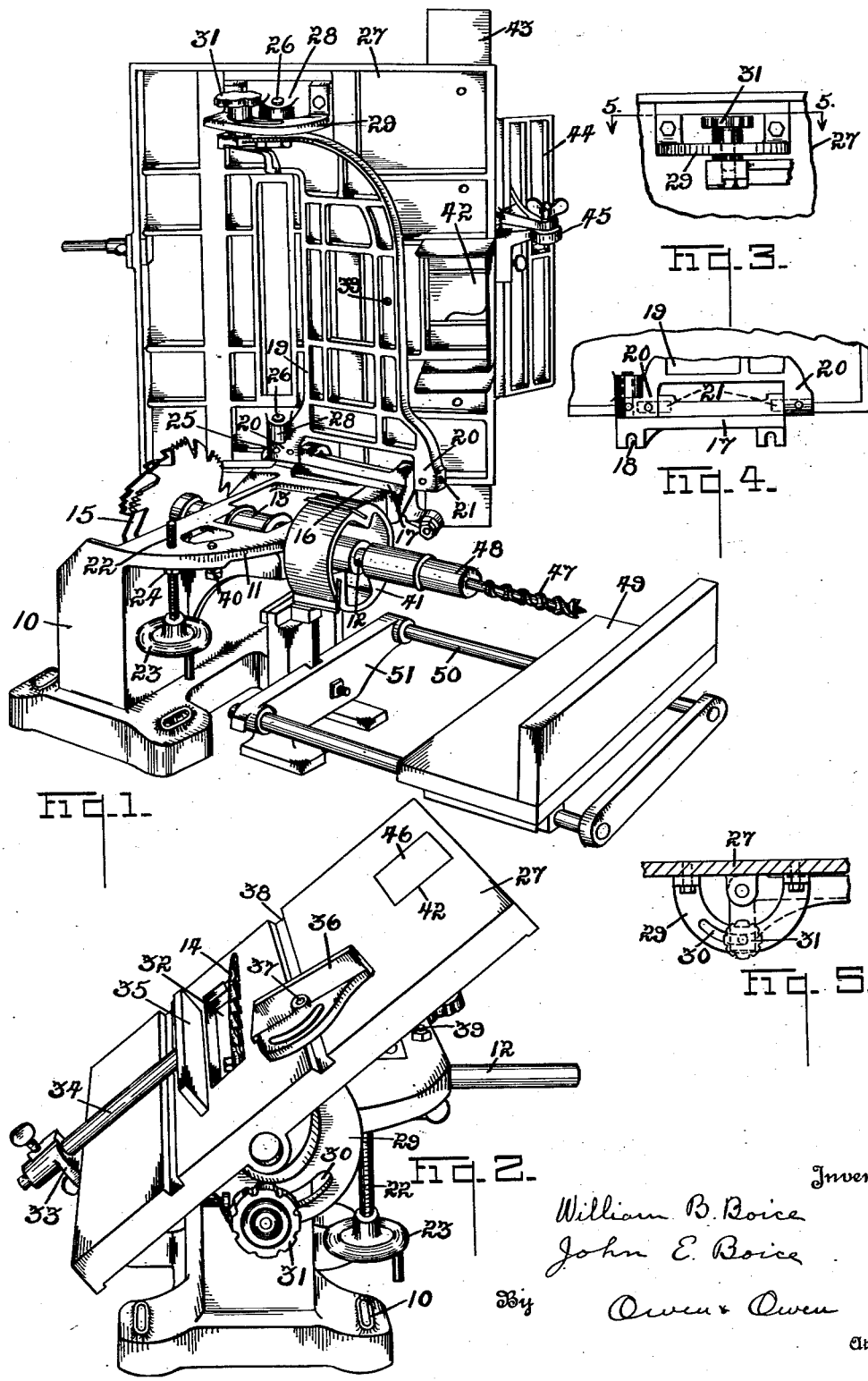
Inventors
William B. Boice
John E. Boice
By Owen & Owen
Attorneys Patented Jan. 7, 1930

1,742,644

UNITED STATES PATENT OFFICE

WILLIAM B. BOICE AND JOHN E. BOICE, OF TOLEDO, OHIO

ADJUSTABLE TABLE FOR WOODWORKING MACHINES AND THE LIKE

Application filed November 12, 1927. Serial No. 232,769.

This invention relates to an adjustable table especially adapted to be used in connection with woodworking machines, or other machines which are operated in a similar manner, for supporting the material to be worked upon. In these machines, the table is supported above a mandrel, and a tool, as for example, a circular saw, is mounted upon the mandrel, projecting upwardly through a slot in the table, suitable means being provided for guiding the material over the table while it is being worked upon.

The general object of the present invention is to provide improved means for adjusting the table angularly about an axis transverse to the mandrel and also about an axis parallel thereto, the latter adjustment serving also to elevate the table with respect to the tool. The adjusting mechanism is so arranged that the edges of the slot in the table are always maintained in parallel relation to the saw.

The invention also includes a base of improved construction for supporting the mandrel, the table, and the means by which the adjustment and maintenance of the table in the desired position is facilitated.

The essential features of the invention, in the form which at present seems most desirable, will be more specifically explained in connection with the accompanying drawings, which illustrate the same in connection with one type of wood-working machine.

In the drawings:

Figure 1 is a perspective view of a wood-working machine with various attachments thereon, and constructed according to the invention, the table being raised in order to illustrate better the adjusting means therefor.

Fig. 2 is a perspective view showing the table in one position of adjustment.

Fig. 3 is a fragmentary bottom plan view illustrating the means for securing the table in adjusted relation to the cradle.

Fig. 4 is a detail view illustrating the means for connecting the table to the base.

Fig. 5 is a detail view taken on the line 5—5 of Fig. 3.

In the present embodiment of the invention the table and the wood-working mechanism are supported upon a base 10 which may be formed of cast metal and which is provided at its top with a lateral extension 11 having bearings for supporting a mandrel 12. The extension 11 is of skeleton formation, providing space for a driving pulley 13 which is secured to the mandrel 12 and driven from any suitable source of power. Various tools may be selectively attached to the mandrel 12, such as a saw 14 illustrated in Fig. 2, or a channel-cutting tool 15, as shown in Figure 1.

The top 11 of the base is formed at one end with a seat 16 against which is secured a bearing block 17, this block being provided with slots 18 for receiving bolts or other securing means. A cradle 19 is formed at one end with opposed lugs 20 in which are secured gudgeons 21 extending inwardly into bearings in the ends of the block 17. These gudgeons are on a line parallel to the mandrel 12 and are adapted to support one end of the cradle 19 while the other end of the cradle rests upon the upper end of an adjustable screw 22 which is manipulated by means of a hand wheel 23. The screw 22 may be secured in any position of adjustment by means of a lock nut 24.

The cradle 19 has lugs 25 projecting from one side thereof in which are secured gudgeons 26 for supporting a table 27, said table being formed on its underside with bearings 28. The table 27 may be adjusted about the gudgeons 26 as an axis and secured in its adjusted position by means of an arcuate bracket 29 secured to the underside of the table adjacent the end of the cradle 19 and formed with a slot 30 through which a suitable clamping member 31 may be secured to the cradle.

The saw 14 or similar tool is adapted to project upwardly through a slot 32 in the table as shown in Fig. 2. The cradle 19 is adjustable about the axis formed by the gudgeons 21, which axis is parallel to the mandrel 12 and the gudgeons 26 constitute an axis which lies in the plane of the saw 14 and about which the table 27 is adjusted with respect to the cradle. It will be seen, therefore, that the table may be adjusted at any angle either transversely or longitudinally and the saw will always be maintained in parallel relation to the edges of the slot 32.

A bracket 33 is secured to one edge of the table and adjustably supports a spindle 34 carrying a head 35 against which may be guided the material to be worked upon. For mitering the ends of molding and similar material, a guide bracket 36 is mounted for angular adjustment on a spindle 37 which is guided in a channel 38 formed in the face of the table and parallel to the plane of the saw 14.

A stop 39 is adjustably mounted in the cradle 19 to limit the downward adjustment of the table 27 and a stop 40 is adjustably mounted in the top portion 11 of the base to limit the downward adjustment of the cradle 19. These stops will usually be adjusted so that the surface of the table 27 is horizontal when adjusted to its lowermost position.

Provision may also be made for securing a planing tool 41 to the mandrel 12 and an opening 42 is provided in the table through which the planing tool may act upon the surface of material which is fed across the table. A bed 43 may be secured to the table for the material to rest upon and a guide member 44 may be adjustably mounted upon a bracket 45 secured to the edge of the table. When the planing tool is not being used, the opening 42 may be filled by a block 46.

The machine may also be used for boring. For this purpose an auger 47 may be mounted in a chuck 48 secured to the end of the arbor 12. When the machine is so used, a support 49 is slidably mounted on guides 50 extending outwardly from a vertically adjustable carriage 51 mounted upon the base beneath the arbor 12.

In accordance with the invention, the table 27 may be easily adjusted in its relation to the saw, either about the mandrel as an axis or about an axis which lies in the plane of the saw. In any position to which the table is adjusted the plane of the cut is parallel to the edges of the slot 32 and to the channel 38. While the invention is primarily adapted to be applied to wood-working machines in the cutting of miters and bevels, it is obvious that the same principles may be used in connection with various other machines. It is also apparent that the details of the invention may be considerably modified without any material departure from the essential features thereof. It is our intention, therefore, to include all such modifications within the scope of the appended claims.

We claim:

1. In a machine of the class described, the combination of a base, a mandrel mounted in the base, means for securing a tool to the mandrel, a table supported above the base and having a slot through which the tool normally projects, a guide member against which material may be held to be worked upon by said tool, said guide means being mounted and guided for movement over the surface of the table in a direction parallel to the plane of rotation of the tool, said guide means being angularly adjustable about an axis perpendicular to the surface of the table to vary the angle at which the material is held, and means for selectively adjusting said table angularly with respect to the base about either a longitudinal or a transverse axis.

2. In a machine of the class described, the combination of a base, a mandrel mounted in the base, means for securing a tool to the mandrel, a cradle supported by said base and adjustable angularly about an axis parallel to the mandrel, a table supported by said cradle and angularly adjustble thereon about an axis which lies in the plane of rotation of the tool, said table having a slot through which the tool normally projects, a guide member against which material may be held to be worked upon by said tool, said guide means being mounted and guided for movement over the surface of the table in a direction parallel to said slot, said guide means being angularly adjustable about an axis which is perpendicular to the plane of the table to vary the angle at which the material is held.

3. In a machine of the class described, the combination of a base, a mandrel mounted in the base, means for securing a tool to the mandrel, a cradle supported by said base and adjustable about an axis parallel to the mandrel, bearing members on said cradle aligned in the plane of rotation of said tool, the tool being between said members, and a table supported by said members and angularly adjustable about the same as an axis, said table having a slot through which the tool normally projects.

4. In a machine of the class described, the combination of a base, a mandrel rotatably supported by the base, means for securing a tool to the mandrel, horizontally aligned gudgeons at one end of the base parallel to the mandrel, a cradle adjustable about said gudgeons as an axis, aligned gudgeons carried by said cradle in front of and in rear of said tool respectively and in the plane of rotation of said tool, a table adjustable about said last mentioned gudgeons as an axis, said table having a slot through which the tool normally projects, a stop secured to the base limiting the downward adjustment of the cradle, and a stop secured to the cradle limiting the downward adjustment of the table, said stops being normally adjusted so that the lowest position of the table is in a horizontal plane perpendicular to the plane of rotation of the tool.

In testimony whereof, we have hereunto signed our names to this specification.

WILLIAM B. BOICE.
JOHN E. BOICE.